Nov. 24, 1953     B. J. COUMERILH     2,660,454
COMBINED REAR TRAILER BUMPER AND STEP
Filed Feb. 28, 1952     2 Sheets-Sheet 1

INVENTOR
B. J. Coumerilh
BY Christian L. Nielsen
ATTORNEY

Nov. 24, 1953  B. J. COUMERILH  2,660,454
COMBINED REAR TRAILER BUMPER AND STEP
Filed Feb. 28, 1952  2 Sheets-Sheet 2

INVENTOR
B.J. Coumerilh
BY Christian R. Nielsen
ATTORNEY

Patented Nov. 24, 1953

2,660,454

UNITED STATES PATENT OFFICE 2,660,454

COMBINED REAR TRAILER BUMPER AND STEP

Berton J. Coumerilh, St. Louis, Mo.

Application February 28, 1952, Serial No. 273,989

3 Claims. (Cl. 280—163)

This invention relates to motor vehicle trailers and tractors and more particularly to a rear bumper and step therefor, and it consists in the constructions, arrangements and combinations herein described and claimed.

It is the cardinal object of the invention to provide a rear bumper and step for trailers and tractors of sturdy construction, affording rear end protection to the trailer or tractor, as well as accessories which may be mounted on the rear of the vehicle, such as tail and signal lights.

It is a still further object of the invention to provide a rear end bumper for trailers and the like constructed in such a manner as to provide a step enabling ready access into the trailer body, the bumper further including bracing means which eliminates the sagging of rear corner posts of the trailer body, as well as providing stability to the rear doors of the trailer or tractor.

A still further object of the invention is the provision of a rear bumper which may be readily installed upon new vehicles or vehicles now in use, with a minimum of labor.

Additional objects, advantages and features of invention will be apparent from the following description considered in conjunction with the accompanying drawings, wherein, Figure 1 is a fragmentary perspective view of the rear end of a trailer having the bumper installed thereon.

Figure 1:
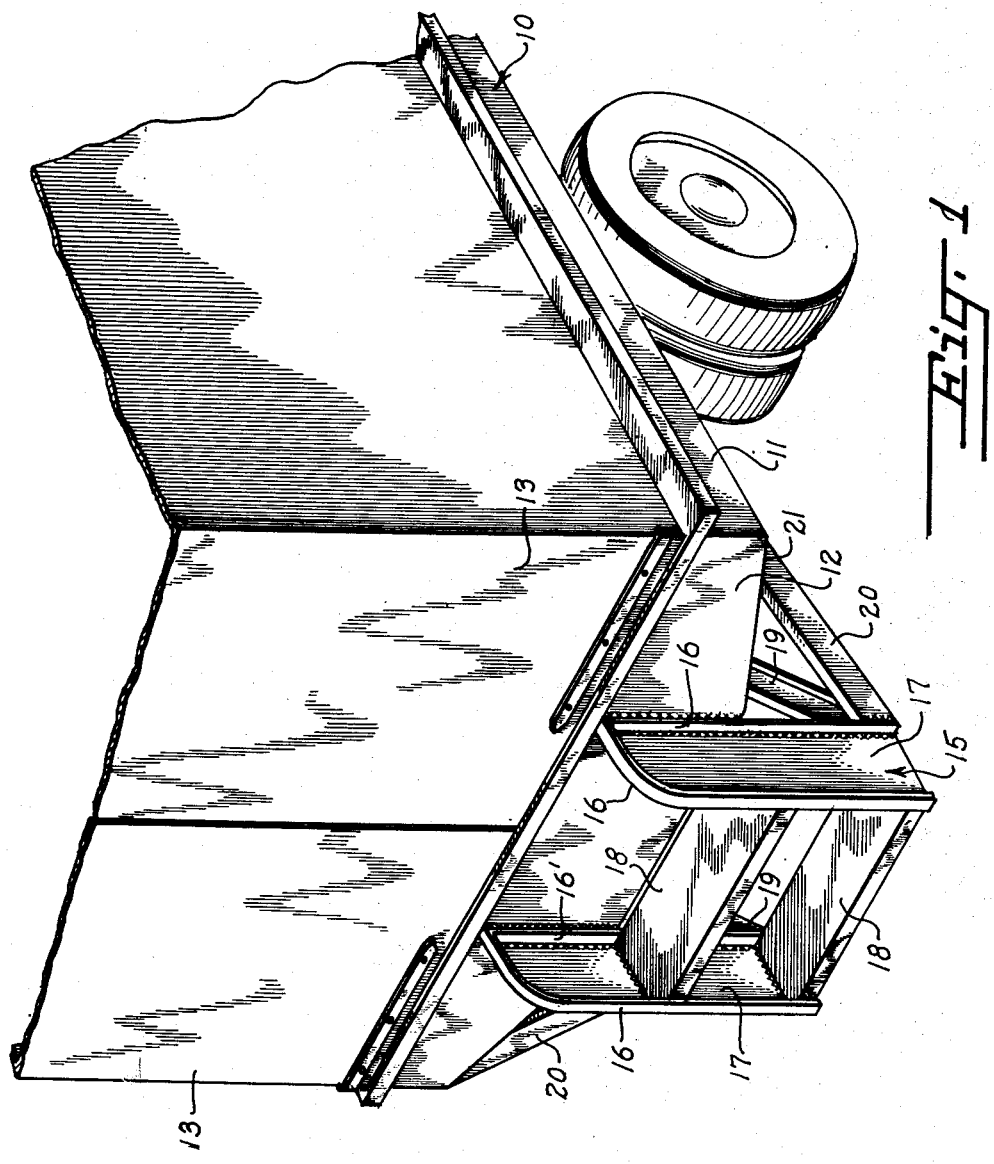
Figure 2:
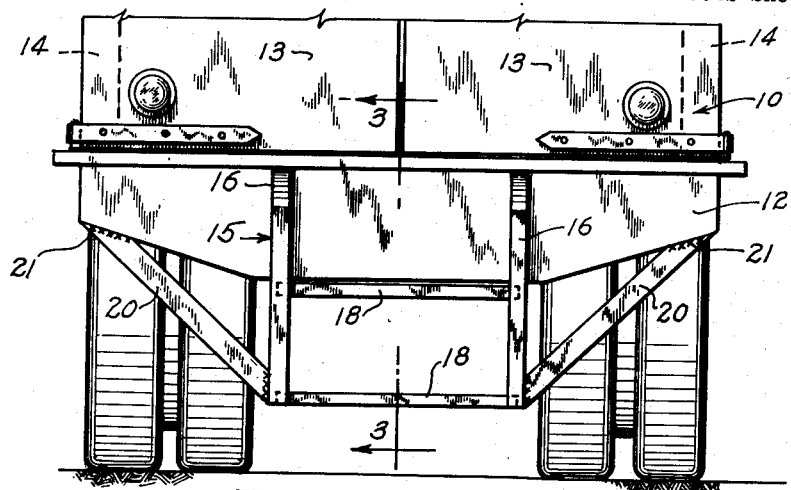
Figure 2 is a rear end of the trailer with the bumper installed.
Figures 3, 4:
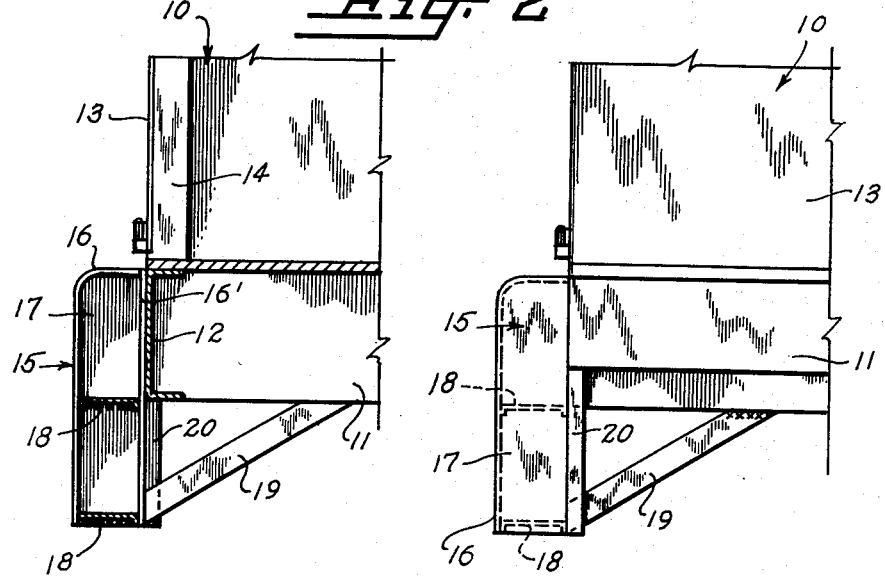
Figure 3 is a sectional view on the line 3—3 of Figure 2.
Figure 4 is a fragmentary side elevation of the trailer with the bumper attached.

There is illustrated a portion of a trailer 10 of conventional construction including a chassis 11 having a rear end wall 12, the trailer further having a pair of doors 13 hingedly connected to respective sides of the body and positioned outwardly of respective corner posts 14 of the body.

The combined bumper and step is indicated at 15 and will now be described. As shown, the bumper comprises a pair of upright I-beams 16 arranged in parallel relation. The I-beams comprise a front flange and a rear flange connected by a web 17 as is customary. Between the web 17 and the flanges of each beam 16 a step 18 is suitably spaced and welded to the flanges and the webs.

The front flange 16' of each beam 16 will be positioned in vertical alignment and centered with the longitudinal axis of the chassis and welded to the rear end wall 12 thereof.

A front brace 19 is employed upon opposite sides of the bumper 15, the ends of the braces being suitably mitered so as to fit snugly between lower ends of respective uprights 16 and the underside of side stringers of the chassis 11 and welded. As shown, the braces 19 extend diagonally between the bumper 15 and the chassis 11 in the longitudinal axis of the chassis, thus providing great rigidity to the bumper so as to withstand impacts which may be imparted to the bumper in the event of a rear end collision.

To further brace the bumper 15, side braces 20 are employed positioned upon opposite sides of the uprights 16, the ends of the braces being mitered so as to properly seat between the lower ends of the uprights 16 and the rear wall 12 of the chassis, the ends being welded to abutting surfaces. It will be noted that the braces 20 extend diagonally upwardly and outwardly so as to position the upper ends 21 directly beneath respective corner posts 14 of the trailer, thus affording added support to the posts 14 and doors 13 of the trailer.

In the present instance, the uprights 16 are five inch I-beams; the steps 18 are constructed from five inch channel plates, while the front braces 19 and side braces 20 are formed from three inch channel members, which when assembled as shown and described, will provide a bumper and step construction of a rigidity calculated to withstand the most severe bumps and jolts; and by reason of the fact that the uprights 16 are of substantial widths liability of contact with the rear end of the trailer body is eliminated, thus protecting the body as well as rear or signal lights ordinarily employed upon trailer bodies.

While I have shown and described a preferred form of the combined bumper and step, this is by way of illustration only and I consider as my own all such modifications in construction as fairly fall within the scope of the appended claims.

I claim:

1. A combined bumper and step for securement to the rear end wall of the chassis of a trailer or the like comprising a pair of spaced upright members, steps vertically spaced and connected between said upright members, said upright members being welded to the rear end wall of the chassis of a trailer, a front brace member connected between the lower ends of each upright member and extended forwardly and secured to respective side stringers of said chassis, and a side brace member connected to the lower end of respective upright members, said side brace members being extended upwardly and outwardly for securement to the rear portions of said stringers.

2. A combined bumper and step for securement to the rear end wall of the chassis of a trailer or the like, comprising a pair of spaced parallel upright I-beams having a front flange, a rear flange and a connecting web, vertically spaced step plates disposed between said flanges and welded to the web and flanges of each I-beam, the front flange of each I-beam being disposed flat against the rear end wall of the chassis and welded thereto, a front brace extended diagonally between the lower end of each I-beam and respective stringers of the chassis and welded to abutting portions, a side brace member welded to the lower end of each I-beam extended diagonally outward and upwardly to occupy a position beneath respective rear corner posts of the body of the trailer, the upper ends of said side braces being welded to said chassis.

3. A combined bumper and step for securement to the rear end wall of the chassis of a trailer or the like, comprising a pair of spaced parallel upright I-beams having a front flange, a rear flange and a connecting web, said web being of substantial width to space the rear flange a distance from the front flange, vertically spaced step plates disposed between said flanges and welded to the web and flanges of each I-beam, the front flange of each I-beam being disposed flat against the rear end wall of the chassis and welded thereto, a front brace extended diagonally between the lower end of each I-beam and respective stringers of the chassis and welded to abutting portions, a side brace member welded to the lower end of each I-beam extended diagonally outward and upwardly to occupy a position beneath respective rear corner posts of the body of the trailer, the upper ends of said side brace members being welded to said chassis.

BERTON J. COUMERILH.

References Cited in the file of this patent

UNITED STATES PATENTS

| Number | Name | Date |
|---|---|---|
| 420,143 | Colbert | Jan. 28, 1890 |
| 1,771,423 | Spangenberg | July 29, 1930 |
| 2,222,616 | Hawkins | Nov. 26, 1940 |
| 2,246,985 | Pellegrini | June 24, 1941 |
| 2,476,814 | Carmack | July 19, 1949 |